July 30, 1968 H. B. GROW 3,394,625
MUSIC EDUCATION DEVICE WITH TONE GENERATORS
CORRESPONDING TO NOTES ON A STAFF
Filed May 31, 1966
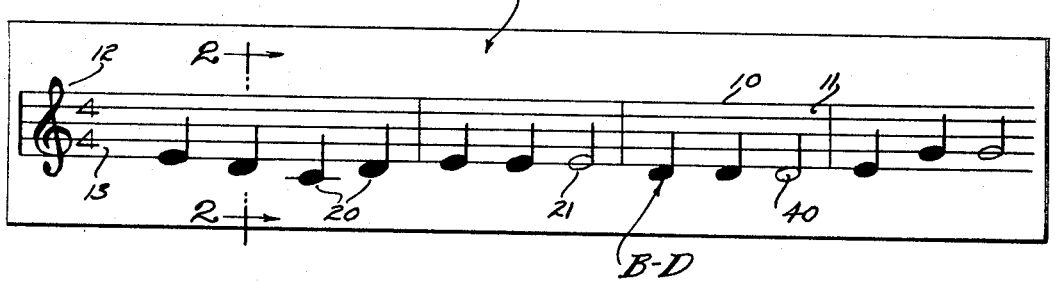
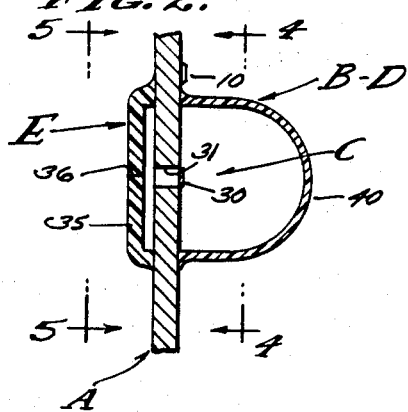
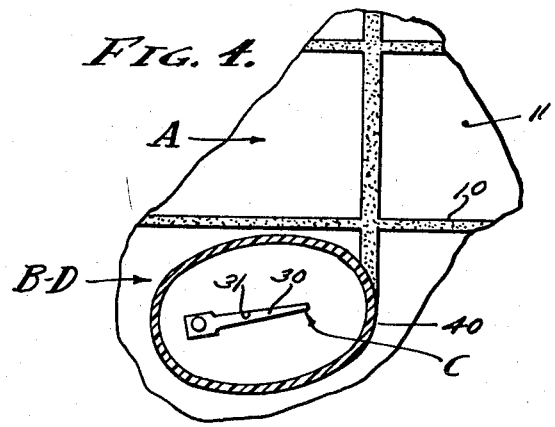
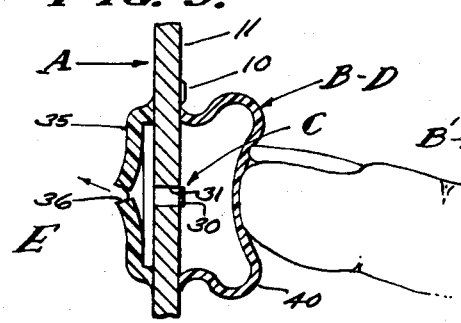
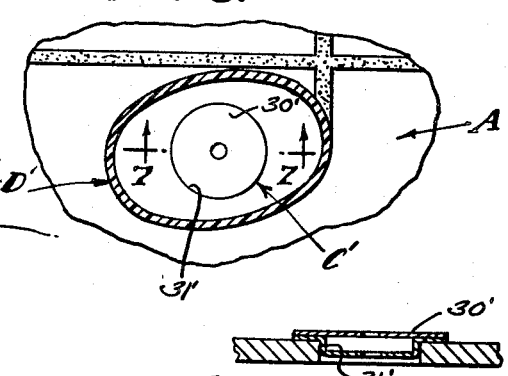
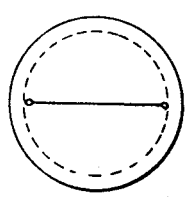
INVENTOR.
HARLOW B. GROW
BY
AGENT United States Patent Office
3,394,625
Patented July 30, 1968

1

3,394,625
MUSIC EDUCATION DEVICE WITH TONE GENERATORS CORRESPONDING TO NOTES ON A STAFF
Harlow B. Grow, 16530 Chattanooga Place, Pacific Palisades, Calif. 90272
Filed May 31, 1966, Ser. No. 554,118
8 Claims. (Cl. 84—471)

ABSTRACT OF THE DISCLOSURE

This invention relates to a musical device of an educational nature and is particularly concerned with the pitch of notes as related to the musical score, and provides an instrument which inherently presents a proper association of pitch with the placement of notes on the staff. Specifically, the instrument comprises a plurality of manually depressible wind producing means and each of which is associated with and operates a tone generator, all of which operates through manual actuation as related to placement thereof on a representation of the musical staff. Each wind producing means resembles the musical note that it produces when manually depressed.

---

The association of pitch as related to the musical staff as it is conventionally written is often difficult to teach, and although various logical systems are employed to teach the same they are usually met with difficulties. For example, temporary or permanent misconceptions are often the result of improper associations or no association at all of pitch to the placement of notes on the staff.

The present invention is concerned with the learning of music in the basic sense of note relationship. To this end an instrument is provided and which, because of its inherent characteristics, enforces a proper association of pitch to the written note, in each and every instance. Thus, the instrument involves illustration of written music and of tone generation related thereto and both of which are exposed to the senses of the person operating the device, and the operation of which requires correlation of the various senses brought to play in said person. Additionally, the sense of touch or feel is involved, and with the result that the three senses of sight, touch and sound are necessarily correlated in the person when operating the device, the imposition of these three sense factors being inescapable. As a result, the function of the device is to impose invariable educational enforcement, and always properly applied.

An object of this invention is to provide an instrument that can be made in various ways as circumstances require, and which invariably relates sound to notes as they are written on the musical staff.

Another object of this invention is to provide an instrument of the character thus far referred to that can be treated as a toy, but which is nevertheless educational in its fundamental concept and inherent action.

The various objects and features of this invention will be fully understood from the following detailed description of the typical preferred forms and applications thereof, throughout which description reference is made to the accompanying drawings, in which:

FIG. 1 is a front view showing the visible portion of the instrument of the present invention.

FIG. 2 is an enlarged sectional view showing a fragment of the structure and taken as indicated by line 2—2 on FIG. 1, while FIG. 3 is a view similar to FIG. 2 illustrating the manner in which the instrument is manually operable, and FIG. 4 is a sectional view taken as indicated on line 4—4 on FIG. 2, while FIG. 5 is a view taken as indicated by line 5—5 on FIG. 2.

FIG. 6 is a view similar to FIG. 4 showing a second form, and FIG. 7 is a sectional view taken as indicated by line 7—7 on FIG. 6.

The music education device of the present invention is to be distinguished from a noise-maker which is often the effect that results from sound generating instruments played by the novice. In other words, indiscriminate sound production results in noise, with no recognizable order of pitch relationship, and without musical quality. Music, therefore, is the combining of sounds of various pitch and rhythm, and both the pitch and rhythm must be associated in order for a person to reproduce music as it is presently appreciated, and especially for a person to read the same from a musical score. It is enough for the purpose of this invention to be concerned with pitch and rhythm, and primarily it is the pitch of the musical tone with which the proper staff location thereof is to be made. Secondarily, it is the duration of the musical tone that is to be considered. Generally, therefore, the present invention involves a body A in the form of a musical staff, one or more notes B placed upon and as they are normally written upon the staff, a tone generator C for each note respectively, and means D operable to energize each tone generator C upon manual engagement of its related and respective note B. The elements A through D are incorporated in a unit, the first form of which will now be described.

The body A is a necessary part of the device and is characteristically an oversized facsimile of a musical score. The said musical score can vary without restriction and is established for each embodiment of the device. For example, the first phrase of the nursery rhyme "Mary Had A Little Lamb" as it is universally put to music is depicted in FIG. 1 of the drawings. In this instance there is a musical staff comprised of five horizontal lines 10 and four intermediate spaces 11, and in this instance indicated as the treble clef at 12. Also, the signature 13 is indicated at the left with the clef indication, in this instance as four-four time in the key of "C," no sharps or flats. It is to be understood that the clef 12 can change and that the signature 13 can change as the necessities arise. In the case illustrated there are four counts to the measure and each quarter note gets one count. As the staff is shown, the lines 10 represent the notes and/or pitches "E," "G," "B," "D" and "F" progressively from the bottom to the top, and the spaces 11 represent the notes and/or pitches "F," "A," "C" and "E" progressing from the bottom to the top. Further, there are the usual notes and/or pitches represented by the lines and spaces both above and below the staff, the first space and first line below the staff being employed in the example FIG. 1.

The foregoing is a specification of the usual staff of a certain clef and with a definite signature, and all of which is incorporated in the body A which is a structural embodiment having the physically visible features as set forth. However, the body A is more than the usual written score of music in that it is the base for carrying the notes B or related to the tone generator C and the means D by which said generators speak when said notes are manually engaged for such purpose. To this end, therefore, the body A is a flat planar element of a size and configuration to contain and display the musical staff above referred to, and preferably of rather large size in comparison to the usual written music in order to accommodate the notes B, tone generators C and the means D hereinafter described. The planar element is a flat sheet of plastic or metal, as the case may be. As shown, the staff is several or more inches in height and a foot or two in length, and thereby presents a substantially impressive instrument, it being understood that the size can vary according to changing requirements.

The notes B are to be fashioned in various ways and are positioned to have a normal appearance when placed upon the body A with its staff of lines 10 and spaces 11. Accordingly, there are quarter notes 20 which are black with a stem; there are half notes 21 which are white with a stem; and there can be the various other notes (not shown). In any case, the notes are rounded and/or characteristically oval shaped objects disposed on the horizontal or slightly inclined, and of a height not to exceed the distance between lines 10. In practice, the notes 20 and 21 are three dimensional and such that they exist physically on the front surface of the body A.

The tone generators C can vary and in the preferred form are energized by the passing of wind therethrough. As is shown in the first form, the tone generators are of the reed type, each being a free swinging reed 30 mounted at its base end on one side of the body A and with its free end to swing through a closely clearing opening 31 through the body. This type of reed is common to organs and the like and is readily fashioned to vibrate at a constant and predetermined pitch. In accordance with the invention there is a reed 30 related to each note B and preferably located at each note B. Consequently, there is an opening 31 at or underlying each of said notes, and a reed 30 is mounted thereat and tuned to vibrate at the pitch represented by the placement of that particular note on the staff. In the example FIG. 1 the notes are progressively the correct note and related pitch therefor, and recognizable when sequentially played as the melody above mentioned.

The means D by which the generators C are made to speak can vary according to the type of generators employed. Preferably, the means D is a wind producing means which in itself resembles the physical attributes of an actual musical note. Therefore, the means D is a physical three dimensional enlargement of the note B, in each instance and involves an air cell 40 of bellows form and which is manually engageable for its depression to expel wind through the opening 31. The amount of wind must be quick and substantial in order to cause audible speaking of the reed 30, and to this end the cell 40 is sizable. In practice, the cell 40 is a hollow oval-shaped shell of resilient material that can be easily depressed and which then returns to its original configuration due to its memory. In practice, various materials can be employed, for example rubber and its substitutes, such as polypropylene, flexible polyvinyl chloride. Air cell 40 is appropriately colored so as to resemble a white note or black note as the case may be, by employing suitable colored materials or by painting the notes as circumstances require. In carrying out the preferred form of the invention, the air cell 40 is in the nature of a housing that has side walls secured to the surface of the body A surrounding the reed 30, said reed being fastened to the wind pressure side of the body and within the chamber of cell 40. Thus, the reed is protected and will sound or speak when the air cell 40 is manually depressed. Upon manual release, the air cell 40 recovers its original oval shape without sounding the reed, inasmuch as this type of reed speaks only when pressured from its mounting side.

Recognizing that a gentle pressing of the air cell 40 will not necessarily provide adequate wind for causing the reed 30 to speak, pressure means E is provided and which also serves as an enclosure excluding particles from the reed chamber and passage 31. Pressure means E is restrictive to air flow and remains closed until some air pressure is developed and after which it tends to freely pass the air under pressure. As shown, the means E is a panel 35 of bendable and resilient material, for example of the materials hereinabove specified, attached to the body A surrounding the reed opening 31 and with a transverse slit at 36, so that the panel 35 has opposedly abutted edges that normally engage flat, one with the other. As a result, a certain amount of pressure can develop before bending of the panel to release the air as shown in FIG. 3, whereupon a blast of air is expelled to excite motion of reed 30. As shown in FIG. 5 the slit at 36 has slightly enlarged ends that present restricted openings to permit seepage of air, permitting the return of air into the air cell 40. In lieu of the means E it is necessary, at least, to tap or to strike the air cell 40, or to poke the same sufficiently in order to cause the reed 30 to speak, as distinguished from a gentle pushing or pressing engagement.

A second form of tone generator C' is shown in FIGS. 6 and 7 and which is also energized by the passing of wind therethrough as by means D', the same as means D hereinabove described. These tone generators are of the whistle type, each being a resonant chamber 30' mounted in an opening 31' through the body A'. This type of whistle involves a flat chamber wherein the opposite walls have small aligned openings, and to the end that vibrations are set up in the chamber and the surrounding air according to the dimensions used. In accordance with the invention there is a whistle chamber 30' related to each note B' and preferably located at each note B'. Consequently, there is an opening 31' at or underlying each of said notes, and a whistle chamber 30' is mounted thereat and tuned to vibrate at the pitch represented by the placement of that particular note on the staff.

In accordance with the invention the facsimile of the musical score is an enlarged version of the same and is proportioned to be immediately recognizable as such. Each note of said musical score is itself manually engageable to sound the pitch that it represents on the musical staff. As is clearly pointed out above, the sounding of each individual note can be remote or direct in the broad sense, the characteristic feature being that the note which is visible to the person operating the device is selected by him, is engaged and felt by him, and when it is pressured by him the proper pitch is audibly sensed by him. It is significant that the entire score is visible to the person as it is normally presented in written music; and by employing a logical and sequential engagement of notes from left to right, the melody of the device or instrument is played correctly as to pitch and the association of note placement on the staff is necessarily enforced on and implanted in the mind of the observant operator. And, in no case can the wrong pitch be associated with a note that is selected and pressured by the person operating the instrument.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. An instrument for the association of tonal pitch with the relative positions of notes on the musical staff and including:
   a body with a musical staff thereon,
   a musical note placed on the staff and comprising a wind blown tone generator tuned to vibrate at the pitch represented by the placement of said note on the staff, and a depressible wind producing cell operable by manual engagement of said note to energize the said tone generator,
   and means restrictive to air flow through the said wind producing cell and wind blown tone generator and responsive to air pressure to release and freely pass the air through said wind blown tone generator.

2. The instrument as set forth in claim 1 and wherein the staff includes a musical score comprised of a plurality of said musical notes placed on the staff and wherein each note has its related tone generator, wind producing cell and means restrictive to air flow, all operable by manual depression to energize the wind blown tone generator.

3. The instrument as set forth in claim 1 and wherein the tone generator is carried by the body at the note, and the said depressible wind producing cell to energize the same is carried by the body over said tone generator and is at least part of the note which is manually depressed.

4. The instrument as set forth in claim 1, wherein the staff includes a musical score comprised of a plurality of said musical notes placed on the staff and wherein each note has its related tone generator, wind producing cell and means restrictive to air flow, all operable by manual depression to energize the wind blown tone generator, and wherein each tone generator is carried by the body at the note, and the said depressible wind producing cell to energize the same is carried by the body over said tone generator and is at least part of the note which is manually depressed.

5. The instrument as set forth in claim 1 and wherein the tone generator is a wind blown reed mounted on the body over an opening therethrough, and the said depressible wind producing cell to energize the same is an air cell communicating with the reed and carried by the body as a part at least of the note which is manually depressed.

6. The instrument as set forth in claim 1, wherein the staff includes a musical score comprised of a plurality of said musical notes placed on the staff and wherein each note has its related tone generator, wind producing cell and means restrictive to air flow, all operable by manual depression to energize the wind blown tone generator, and wherein each tone generator is a wind blown reed mounted on the body over an opening therethrough, and the said depressible wind producing cell to energize the same is an air cell communicating with the reed and carried by the body as a part at least of the note which is manually depressed.

7. The instrument as set forth in claim 1 and wherein the tone generator is a wind blown whistle mounted on the body in an opening therethrough, and the said depressible wind producing cell to energize the same is an air cell communicating with the whistle and carried by the body as a part at least of the note which is manually depressed.

8. The instrument as set forth in claim 1, wherein the staff includes a musical score comprised of a plurality of said musical notes placed on the staff and wherein each note has its related tone generator, wind producing cell and means restrictive to air flow, all operable by manual depression to energize the wind blown tone generator, and wherein each tone generator is a wind blown whistle mounted on the body in an opening therethrough, and the said depressible wind producing cell to energize the same is an air cell communicating with the whistle and carried by the body as a part at least of the note which is manually depressed.

References Cited

UNITED STATES PATENTS

| | | | |
|---|---|---|---|
| 138,714 | 5/1873 | Thompson et al. | 84—470 |
| 159,218 | 1/1875 | Restein | 84—375 |
| 672,678 | 4/1901 | Kitching | 84—470 |
| 912,685 | 2/1909 | Jaros | 84—470 |
| 1,754,459 | 4/1930 | Cash | 84—470 |
| 1,821,311 | 9/1931 | Lamp | 84—478 |
| 2,879,685 | 3/1959 | Page | 84—470 |

FOREIGN PATENTS 8,499   5/1906   Denmark.

ROBERT S. WARD, JR., *Primary Examiner.*